United States Patent [19]

Downing

[11] Patent Number: 5,590,720

[45] Date of Patent: Jan. 7, 1997

[54] LAWN EDGER APPARATUS

[76] Inventor: Dennis D. Downing, 7401 Hammond St., Caledonia, Mich. 49316

[21] Appl. No.: 548,962

[22] Filed: Oct. 27, 1995

[51] Int. Cl.⁶ .................................................. A01D 34/00
[52] U.S. Cl. ............................ 172/18; 172/380; 30/315
[58] Field of Search ................................. 172/13, 18, 19, 172/378, 380, 15, 16; 30/315, 305, DIG. 5; 294/49

[56] References Cited

U.S. PATENT DOCUMENTS

| | | |
|---|---|---|
| D. 302,512 | 8/1989 | Slayton . |
| D. 306,814 | 3/1990 | Shields . |
| 749,357 | 1/1904 | Breitstein ................................. 30/305 |
| 1,090,267 | 3/1914 | Berry . |
| 1,495,211 | 5/1924 | Smolk ..................................... 30/305 |
| 2,503,757 | 4/1950 | Morgan ................................... 172/19 |
| 2,594,508 | 4/1952 | Sitton ...................................... 30/315 |
| 2,624,938 | 1/1953 | Davis . |
| 2,949,670 | 8/1960 | Birchfield . |
| 3,020,637 | 2/1962 | Truran .................................... 172/13 |
| 3,463,238 | 8/1969 | Davies . |
| 4,052,791 | 10/1977 | Anesi . |
| 4,437,523 | 3/1984 | Isbell . |
| 4,577,697 | 3/1986 | Moak . |
| 4,645,010 | 2/1987 | Luedeman . |
| 4,934,464 | 6/1990 | Shields . |
| 4,982,800 | 1/1991 | Shields . |

FOREIGN PATENT DOCUMENTS

| | | | |
|---|---|---|---|
| 859863 | 1/1961 | United Kingdom .................... 172/13 |
| 2078476 | 1/1982 | United Kingdom ............... 30/DIG. 5 |

*Primary Examiner*—Terry Lee Melius
*Assistant Examiner*—Victor Batson

[57] ABSTRACT

A lawn edger apparatus includes a foot plate member which includes a front edge, a rear edge, a first side edge, a second side edge, a bottom face, a top face, a plate length, and a plate width. A blade member is connected to the bottom face of the foot plate member and lies in an orientation plane that intersects the foot plate member and that extends from the front edge to the rear edge. The blade member has a blade length which is less than the plate length, and the blade member is positioned on the foot plate member medially between the front edge and the rear edge and medially between the first side edge and the second side edge. A handle assembly is connected to the foot plate member adjacent to the rear edge. The handle assembly includes a post portion which extends upward from the top face of the foot plate member and lies within the orientation plane. The orientation plane is perpendicular to the foot plate member. The post portion of the handle assembly is a straight post. The blade member is a flat, planar member. The blade member includes a straight front edge, a straight rear edge, and an arcuate middle edge located between the straight front edge and the straight rear edge. The handle assembly includes handle bars connected to the post portion. The handle bars are perpendicular to the post portion.

8 Claims, 3 Drawing Sheets

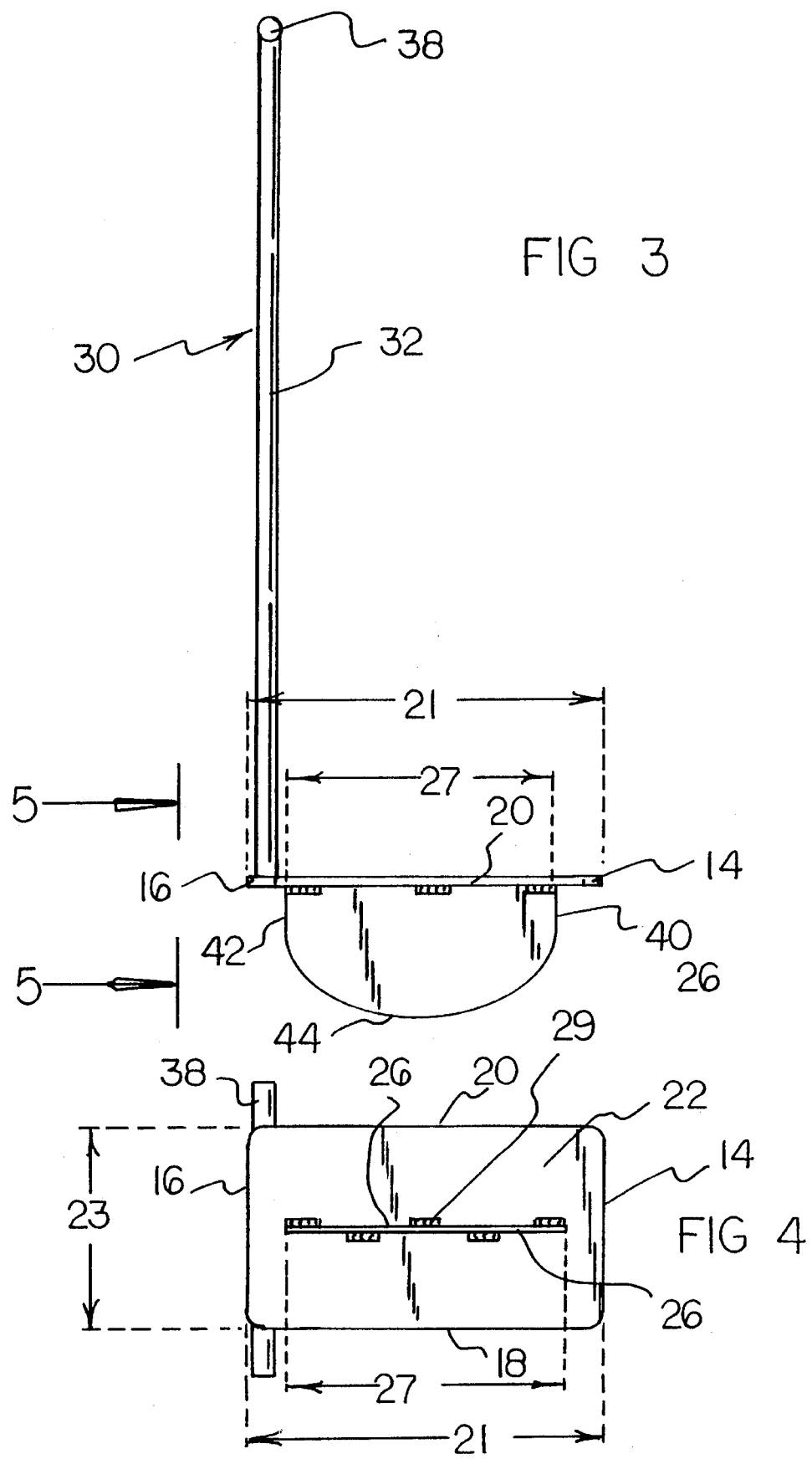

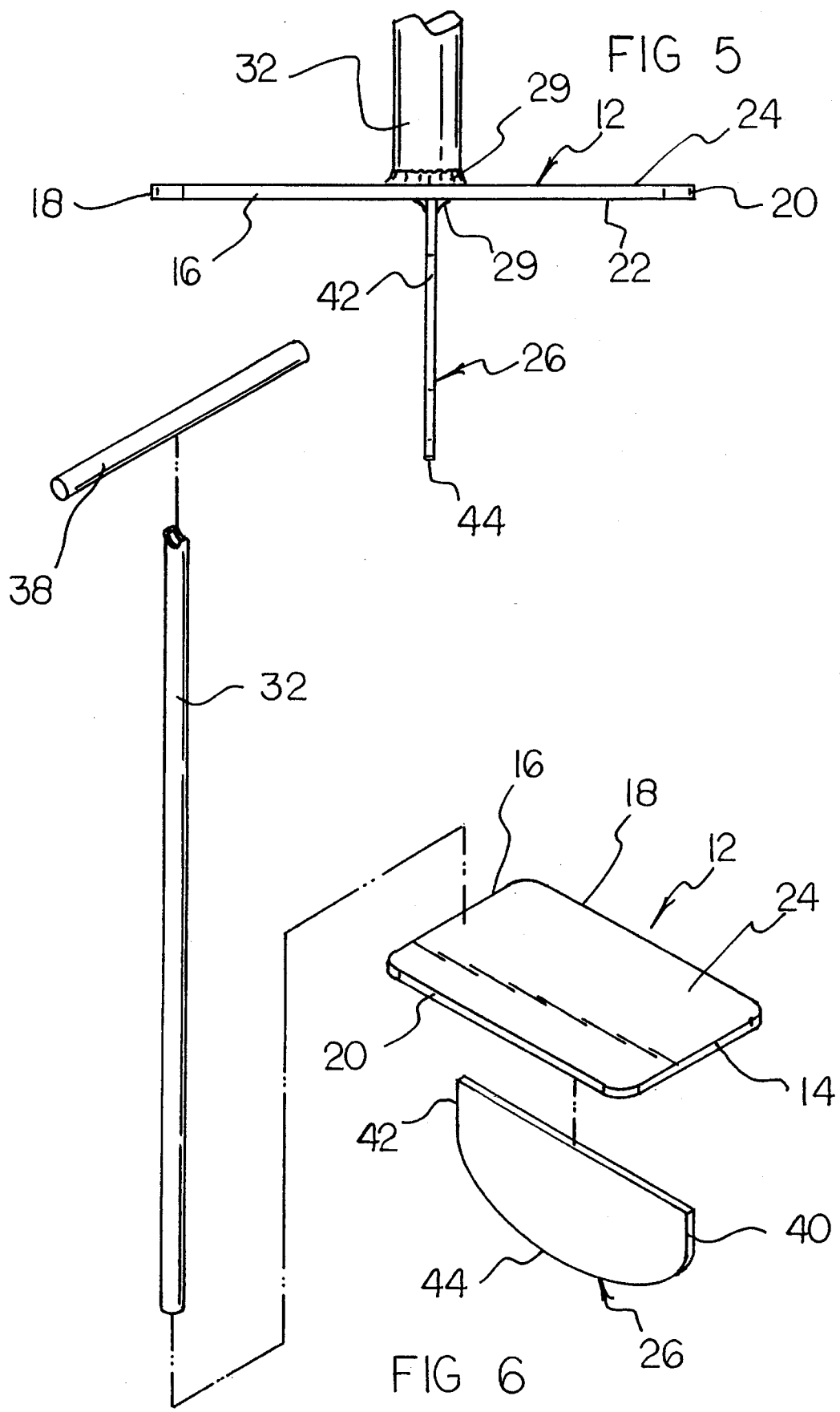

LAWN EDGER APPARATUS

BACKGROUND OF THE INVENTION

1. Field of the Invention

The present invention relates generally to lawn and sod cutting devices and, more particularly, to cutting devices especially adapted for cutting grass and sod adjacent to a sidewalk, driveway, or the like.

2. Description of the Prior Art

Where grass and sod abut a sidewalk, driveway, or the like, it is often desirable to keep the grass and sod neatly trimmed so that the sidewalk, driveway, or the like has a straight and neat appearance. Throughout the years, a number of innovations have been developed relating to lawn edgers, and the following U.S. patents are representative of some of those innovations: U.S. Pat. Nos. 1,090,267; 2,624, 938; 4,052,791; 4,437,523; and 4,645,010. More specifically, U.S. Pat. No. 1,090,267 discloses a lawn edger device that has a curved blade having a leading edge that lies in a plane perpendicular to the edge of a sidewalk. As such, the blade does not permit a long cut that is parallel to the edge of the sidewalk. In this respect, it would be desirable if a lawn edger device were provided that permits a long cut that is parallel to the edge of a sidewalk.

U.S. Pat. No. 2,624,938 discloses a lawn edger device which includes a blade which permits a long cut that is parallel to the edge of a sidewalk. However, there is no provision for a person to place one's foot and most of one's body weight on a foot plate directly over the blade. In this respect, it would be desirable if a lawn edger device were provided that permits a person to place one's foot and most of one's body weight on a foot plate that is located directly over an edge-cutting blade.

U.S. Pat. No. 4,052,791 discloses a lawn edger device that includes a foot plate that is located directly over an edge-cutting blade. However, the foot plate has a length that is shorter than the blade. As a result, a person's foot can be exposed to the thin, top portion of the cutting blade which can be dangerous, especially if a large portion of the user's body weight falls upon this thin edge. To avoid this problem, it would be desirable if a lawn edger device were provided with a foot plate that is longer than the cutting blade placed under the foot plate.

U.S. Pat. No. 4,437,523 discloses a lawn edger device which also has a foot plate that is shorter than the length of the blade. Moreover, the foot plate, the blade, and the handle are not aligned in the same plane. As a result, when the handle is pushed back and forth, an unwanted transverse torque is developed between the handle and the foot plate. To avoid this unwanted transverse torque, it would be desirable if a lawn edger device were provided in which the foot plate, the blade, and the handle are aligned in the same plane.

U.S. Pat. No. 4,645,010 discloses a lawn edger device which has a cutting blade that is substantially the same length as the foot plate. Moreover, the cutting blade has a substantially straight cutting edge. The straight cutting edge does not permit a user to readily carry out a rocking action on the blade. In this respect, it would be desirable if a lawn edger device were provided with an arcuate cutting blade. Furthermore, the foot plate, the cutting blade, and the handle are not aligned in the same plane, whereby unwanted transverse torque can be developed between the handle and the foot plate. In this respect, as discussed above, it would be desirable if a lawn edger device were provided in which the foot plate, the blade, and the handle are aligned in the same plane.

Still other features would be desirable in a lawn edger device. For example, it would be desirable if the width of the foot plate were considerably greater than the width of the cutting blade, and the cutting blade should be centrally disposed along the under side of the foot plate. In this way, a transverse torque can be applied to the cutting blade directly from the foot plate without developing an unwanted transverse torque from the handle. Moreover, when the foot plate is sufficiently wide, both feet of the user can be placed on the foot plate. This is in contrast with the prior art lawn edger devices which employ a relatively narrow foot plate which does not permit both feet of the user to be placed upon the foot plate simultaneously.

In addition, none of the prior art lawn edger devices discloses a cutting blade that has a straight front-facing edge, an arcuate bottom-facing edge, and a straight back-facing edge. The straight front-facing edge and the straight back-facing edge can aid in the lifting of the arcuate bottom-facing edge out of sod when the device is to be rocked out of the sod to be moved along the sidewalk, driveway, or the like.

Thus, while the foregoing body of prior art indicates it to be well known to use lawn edger devices, the prior art described above does not teach or suggest a lawn edger apparatus which has the following combination of desirable features: (1) permits a long cut that is parallel to the edge of a sidewalk, driveway, or the like; (2) permits a person to place one's foot and most of one's body weight on a foot plate that is located directly over an edge-cutting blade; (3) has a foot plate that is longer than the cutting blade placed under the foot plate; (4) provides a foot plate, a blade, and a handle aligned in the same plane; (5) has an arcuate cutting blade; (6) has a foot plate that is sufficiently wide so that both feet of the user can be placed on the foot plate; and (7) has a cutting blade that has a straight front-facing edge, an arcuate bottom-facing edge, and a straight back-facing edge. The foregoing desired characteristics are provided by the unique lawn edger apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a lawn edger apparatus which includes a foot plate member which includes a front edge, a rear edge, a first side edge, a second side edge, a bottom face, a top face, a plate length, and a plate width. A blade member is connected to the bottom face of the foot plate member. The blade member lies in an orientation plane that intersects the foot plate member and that extends from the front edge to the rear edge. The blade member has a blade length which is less than the plate length, whereby the blade member is located between the front edge and the rear edge of the foot plate member. A handle assembly is connected to the foot plate member adjacent to the rear edge. The handle assembly includes a post portion which extends upward from the top face of the foot plate member and lies within the orientation plane. The orientation plane is perpendicular to the foot plate member. The post portion of the handle assembly is a straight post. The blade member is a flat, planar member.

The blade member includes a straight front edge, a straight rear edge, and an arcuate middle edge located between the straight front edge and the straight rear edge. The handle assembly includes handle bars is connected to the post portion. The handle bars are perpendicular to the post portion. The blade member is positioned on the foot plate member medially between the front edge and the rear edge and medially between the first side edge and the second side edge.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved lawn edger apparatus which has all of the advantages of the prior art and none of the disadvantages.

It is another object of the present invention to provide a new and improved lawn edger apparatus which may be easily and efficiently manufactured and marketed.

It is a further object of the present invention to provide a new and improved lawn edger apparatus which is of durable and reliable construction.

An even further object of the present invention is to provide a new and improved lawn edger apparatus which is susceptible of a low cost of manufacture with regard to both materials and labor, and which accordingly is then susceptible of low prices of sale to the consuming public, thereby making such lawn edger apparatus available to the buying public.

Still yet a further object of the present invention is to provide a new and improved lawn edger apparatus which permits a long cut that is parallel to the edge of a sidewalk, driveway, or the like.

Still another object of the present invention is to provide a new and improved lawn edger apparatus that permits a person to place one's foot and most of one's body weight on a foot plate that is located directly over an edge-cutting blade.

Yet another object of the present invention is to provide a new and improved lawn edger apparatus which has a foot plate that is longer than the cutting blade placed under the foot plate.

Even another object of the present invention is to provide a new and improved lawn edger apparatus that provides a foot plate, a blade, and a handle aligned in the same plane.

Still a further object of the present invention is to provide a new and improved lawn edger apparatus which has an arcuate cutting blade.

Yet another object of the present invention is to provide a new and improved lawn edger apparatus that has a foot plate that is sufficiently wide so that both feet of the user can be placed on the foot plate.

Still another object of the present invention is to provide a new and improved lawn edger apparatus which has a cutting blade that has a straight front-facing edge, an arcuate bottom-facing edge, and a straight back-facing edge.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a side view of the embodiment of the lawn edger apparatus of FIG. 2.

FIG. 4 is a bottom view of the embodiment of the invention shown in FIG. 3.

FIG. 5 is an enlarged, partial front view of the embodiment of the invention shown in FIG. 3 taken along line 5—5 in FIG. 3.

FIG. 6 is an exploded perspective view of the embodiment of the invention shown in FIGS. 1–5.

DESCRIPTION OF THE PREFERRED EMBODIMENT

With reference to the drawings, a new and improved lawn edger apparatus embodying the principles and concepts of the present invention will be described.

Figure 1:
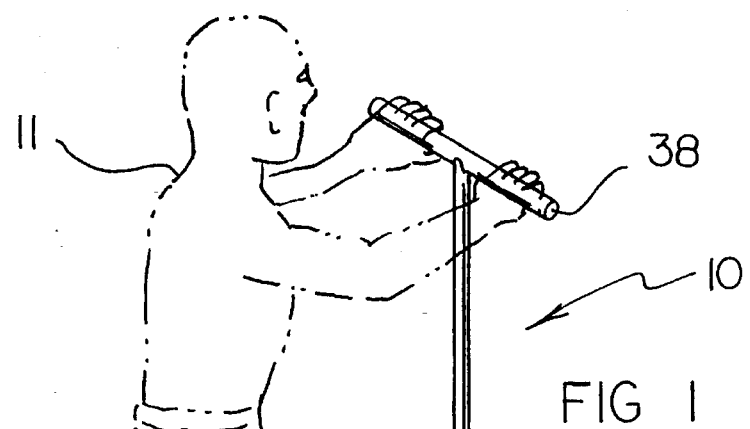
FIG. 1 is a perspective view showing a preferred embodiment of the lawn edger apparatus of the invention with a user holding the handle and having one foot on the foot plate.
Figure 2:
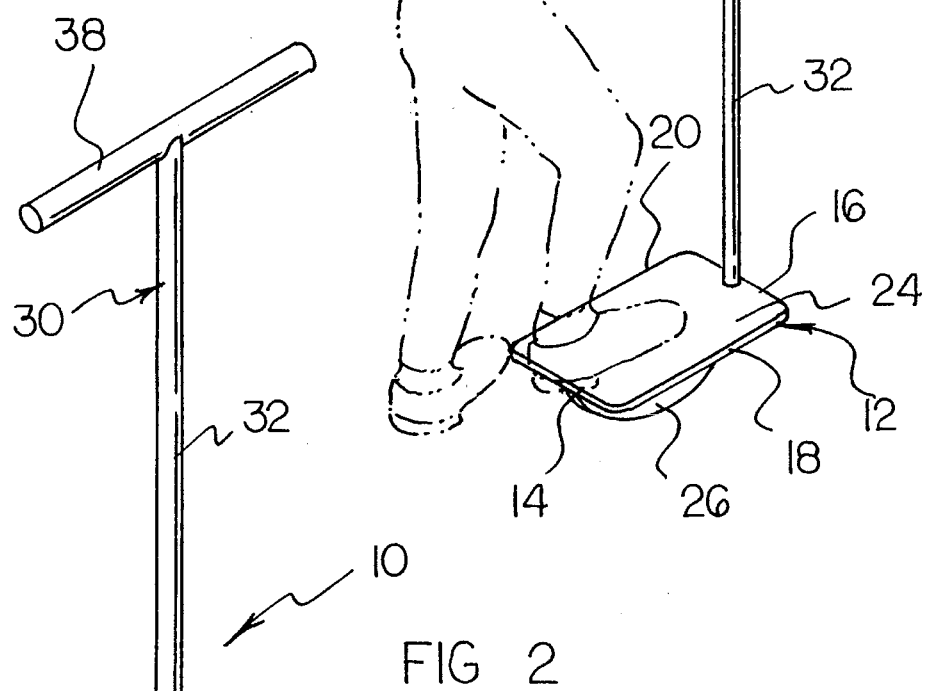
FIG. 2 is an enlarged, additional perspective view of the embodiment of the lawn edger apparatus shown in FIG. 1.
Figure 2:
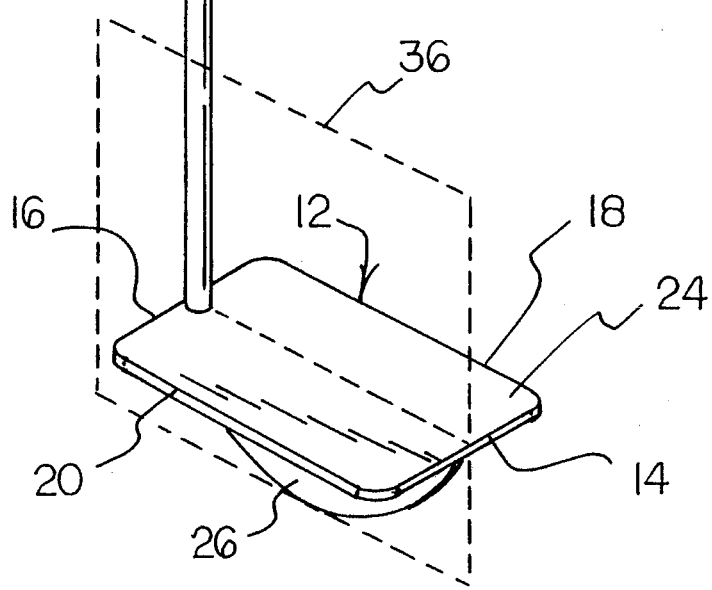

Turning to FIGS. 1–6, there is shown an exemplary embodiment of the lawn edger apparatus of the invention generally designated by reference numeral 10. In its preferred form, lawn edger apparatus 10 includes a foot plate member 12 which includes a front edge 14, a rear edge 16, a first side edge 18, a second side edge 20, a bottom face 22, a top face 24, a plate length 21, and a plate width 23. A blade member 26 is connected to the bottom face 22 of the foot plate member 12. The blade member 26 lies in an orientation plane 36 that intersects the foot plate member 12 and that extends from the front edge 14 to the rear edge 16. The blade member 26 has a blade length 27 which is less than the plate length 21, whereby the blade member 26 is located between the front edge 14 and the rear edge 16 of the foot plate member 12. The blade member 26 can be connected to the foot plate member 12 by welds 29. A handle assembly 30 is connected to the foot plate member 12 adjacent to the rear edge 16. The handle assembly 30 includes a post portion 32 which extends upward from the top face 24 of the foot plate member 12 and lies within the orientation plane 36. The handle assembly 30 can be connected to the foot plate member 12 by welds 29. The orientation plane 36 is perpendicular to the foot plate member 12. The post portion 32 of the handle assembly 30 is a straight post. The blade member 26 is a flat, planar member.

The blade member 26 includes a straight front edge 40, a straight rear edge 42, and an arcuate middle edge 44 located between the straight front edge 40 and the straight rear edge 42. The handle assembly 30 includes handle bars 38 is connected to the post portion 32. The handle bars 38 are perpendicular to the post portion 32. The blade member 26 is positioned on the foot plate member 12 medially between the front edge 14 and the rear edge 16 and medially between the first side edge 18 and the second side edge 20.

In using the lawn edger apparatus 10 of the invention, a person 11 grasps the handle bars 38 and places the blade member 26 against the side of a sidewalk, driveway, or the like. Then, the person 11 places at least one foot on the top face 24 of the foot plate member 12. The person 11 shifts one's weight onto the foot plate member 12 causing the arcuate middle edge 44 of the blade member 26 to be driven into sod or grass next to the sidewalk, driveway, or the like. As a portion of the person's weight is on the foot plate member 12 and as the person grasps the handle bars 38, the person can shift one's weight on the foot plate member 12 causing the blade member 26 to rock back and forth. As the blade member 26 rocks back and forth, the arcuate middle edge 44 of the blade member 26 can more readily penetrate into the sod and cut the sod and grass adjacent to the sidewalk, driveway, or the like. After a particular portion of sod has been cut, the person 11 can step off of the foot plate member 12 and pull back on the handle bars 38 causing the straight front edge 40 of the blade member 26 to assist in lifting the blade member 26 out of the cut sod. Alternatively, the person 11 can push on the handle bars 38 causing the straight rear edge 42 of the blade member 26 to assist in lifting the blade member 26 out of the sod. Moreover, the person 11 can push transversely on the handle bars 38 to cause the blade member 26 to be leveraged away from the sidewalk, driveway, or the like. Once the blade member 26 is lifted out of the sod, the lawn edger apparatus 10 can be pushed forward to a new position on the sod, and the cutting operation can be carried out repetitively. If desired, the plate width 23 can be sufficient to support two feet of the person 11 at the same time.

The components of the lawn edger apparatus of the invention can be made from inexpensive and durable metal, wood, and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved lawn edger apparatus that is low in cost, relatively simple in design and operation, and which may advantageously be used to permit a long cut that is parallel to the edge of a sidewalk, driveway, or the like. With the invention, a lawn edger apparatus is provided which permits a person to place one's foot and most of one's body weight on a foot plate that is located directly over an edge-cutting blade. With the invention, a lawn edger apparatus is provided which has a foot plate that is longer than the cutting blade placed under the foot plate. With the invention, a lawn edger apparatus provides a foot plate, a blade, and a handle aligned in the same plane. With the invention, a lawn edger apparatus is provided which has an arcuate cutting blade. With the invention, a lawn edger apparatus is provided which has a foot plate that is sufficiently wide so that both feet of the user can be placed on the foot plate. With the invention, a lawn edger apparatus is provided which has a cutting blade that has a straight front-facing edge, an arcuate bottom-facing edge, and a straight back-facing edge.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A lawn edger apparatus, comprising:

a foot plate member which includes a front edge, a rear edge, a first side edge, a second side edge, a bottom face, a top face, a plate length, and a plate width, a blade member connected to said bottom face of said foot plate member, wherein said blade member lies in an orientation plane that intersects said foot plate member and that extends from said front edge to said rear edge, wherein said blade member has a blade length which is less than said plate length, whereby said blade member is located between said front edge and said rear edge of said foot plate member, and a handle assembly connected to said foot plate member adjacent to said rear edge, wherein said handle assembly includes a post portion which extends upward from said top face of said foot plate member and lies within said orientation plane, wherein said blade member is positioned on said foot plate member medially between said front edge and said rear edge and medially between said first side edge and said second side edge, and wherein said post portion has a central axis, said central axis intersecting said foot plate member proximal to said rear edge, said central axis lying in said orientation plane and passing through said foot plate member between said rear edge and said blade member.

2. The apparatus of claim 1 wherein said orientation plane is perpendicular to said foot plate member.

3. The apparatus of claim 1 wherein said post portion of said handle assembly is a straight post.

4. The apparatus of claim 1 wherein said blade member is a flat, planar member.

5. The apparatus of claim 4 wherein said blade member includes a straight front edge, a straight rear edge, and an arcuate middle edge located between said straight front edge and said straight rear edge.

6. The apparatus of claim 1 wherein said handle assembly includes handle bars connected to said post portion.

7. The apparatus of claim 6 wherein said handle bars are perpendicular to said post portion.

8. A lawn edger apparatus, comprising:

a foot plate member which includes a first end edge, a second end edge, a first side edge, a second side edge, a bottom face, a top face, a plate length, and a plate width, a blade member connected to said bottom face of said foot plate member, wherein said blade member lies in an orientation plane that intersects said foot plate member and that extends from said first end edge to said second end edge, wherein said blade member has a blade length which is less than said plate length, whereby said blade member is located between said first end edge and said second end edge of said foot plate member, and a handle assembly connected to said foot plate member adjacent to said first end edge, wherein said handle assembly includes a post portion which extends upward from said top face of said foot plate member, wherein said blade member is positioned on said foot plate member medially between said first end edge and said second end edge and medially between said first side edge and said second side edge, wherein said post portion has a central axis, said central axis intersecting said foot plate member proximal to said first end edge, said central axis passing through said foot plate member between said first end edge and said blade member, and wherein said blade member includes a straight first end edge, a straight second end edge, and an arcuate middle edge located between said straight first end edge and said straight second end edge, said central axis of said post intersecting said foot plate member between said foot plate member first end edge and said blade member straight first end edge.

* * * * *